3,296,813
METHOD OF OPERATION OF AN ABSORPTION REFRIGERATION SYSTEM

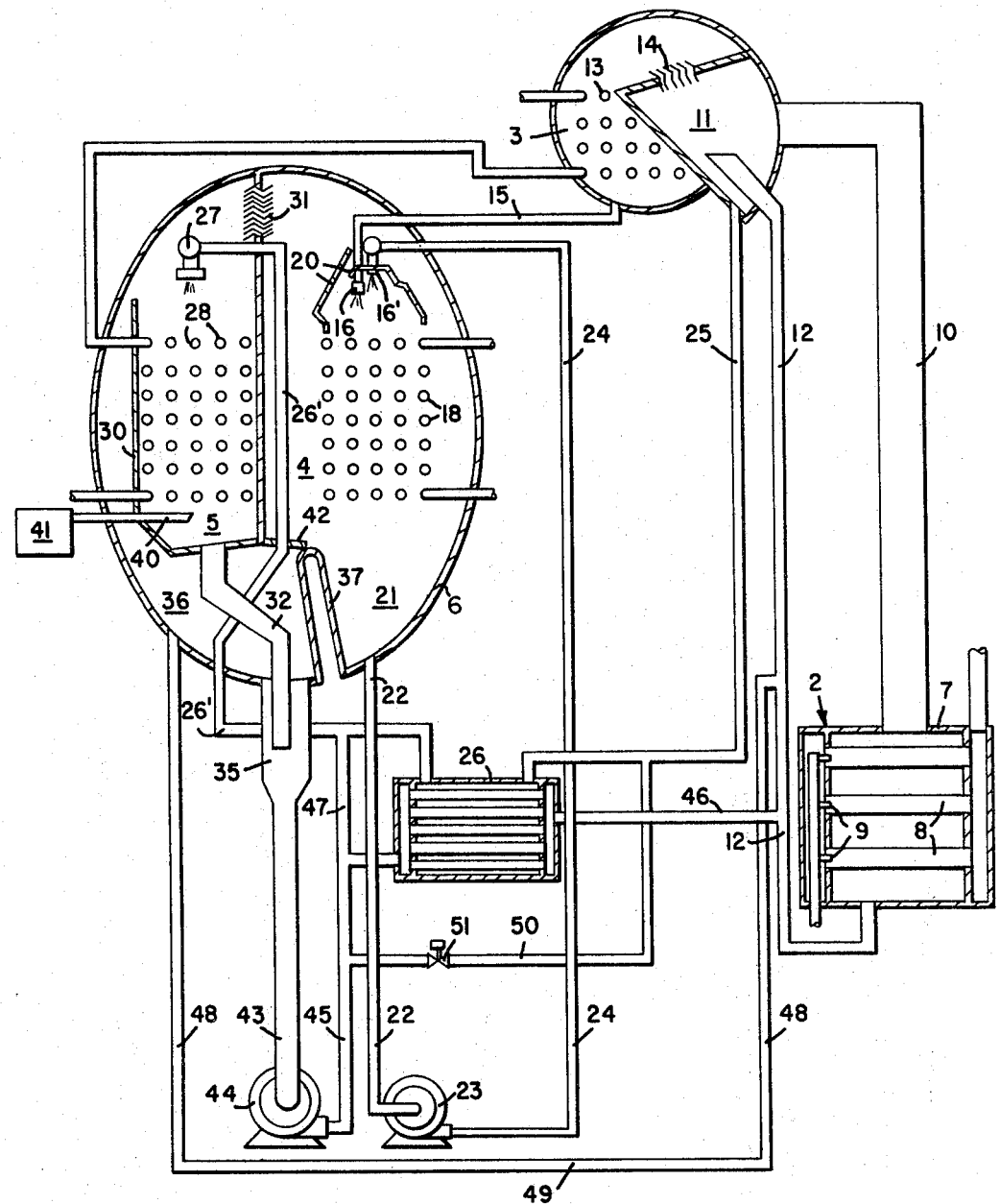

Keith V. Eisberg, Camillus, and Joseph R. Bourne, De Witt, N.Y., assignors to Carrier Corporation, Syracuse, N.Y., a corporation of Delaware
Filed June 21, 1965, Ser. No. 465,426
5 Claims. (Cl. 62—101)

This invention relates to a method of operation of an absorption refrigeration system and, more particularly, to a method of operation of an absorption refrigeration system during temporary shut-down conditions to obviate precipitation of solution in the heat exchanger and to dilute strong solution in those portions of the system in which it is desirable to prevent crystallization of solution.

A problem in operation of absorption refrigeration systems employing a saline solution as an absorbent and water as a refrigerant, particularly when on-off control is utilized in the operation of the system, is the need for dilution when the system is shut down. Each subsequent start-up requires that the dilution water be boiled off to resume operation. With on-off control, the heat input penalty is extremely serious for frequent cycles are encountered and, after each resumption of operation, water of dilution need be boiled off to resume operation.

The chief object of the present invention is to provide a method of operation of an absorption refrigeration system in which precipitation of strong solution is prevented during temporary or short periods of shut-down.

An object of the present invention is to provide a method of operation of an absorption refrigeration system designed to prevent malfunction such as crystallization or solidification of solution in a solution heat exchanger.

A further object of the invention is to provide an absorption refrigeration system so designed as to assure dilution of strong solution in the heat exchanger during shut-down conditions. Other objects of the invention will be readily perceived from the following description.

This invention relates to a method of operation of an absorption refrigeration system including a generator, a condenser, an absorber, an evaporator, a pump to forward weak solution from the absorber to the generator, means to supply strong solution from the generator to the absorber and a heat exchanger for placing strong solution and weak solution in heat exchange relation, in which the steps consist in, during normal operation, forwarding strong solution from the generator through the heat exchanger to the absorber, forwarding weak solution from the absorber through the heat exchanger in heat exchange relation with the strong solution to the generator, passing a cooling medium through the absorber in heat exchange relation with solution therein, and, when refrigeration effect is not required, discontinuing passage of strong solution from the generator to the absorber, and circulating weak solution from the absorber through the heat exchanger to the absorber to prevent precipitation of strong solution in the heat exchanger.

This invention further relates to an absorption refrigeration system including a generator, a separator chamber for weak solution and refrigerant vapor, a first line connecting the generator with the separator chamber, a condenser to receive refrigerant vapor from the separator chamber, an evaporator, a second condensate line connecting the evaporator with the condenser, an absorber, said absorber receiving evaporated refrigerant from the evaporator for absorption by solution therein, a third equalizer line connecting the separator chamber with the generator, a fourth line connecting the absorber with the equalizer line, a pump in said fourth line to forward weak solution from the absorber through said fourth line and the equalizer line to the absorber, a fifth line connecting the absorber with the equalizer line, a sixth line connecting the separator chamber with the absorber, a heat exchanger in the sixth and fourth lines to place strong and weak solutions in heat exchange relation, means for supplying a cooling medium to the absorber in heat exchange relation with solution therein, a bypass line connecting the fourth line and the sixth line, and means in said bypass line for closing the same, actuation of said means opening the bypass line to provide weak solution flow from the fourth line to the sixth line to flush strong solution from the heat exchanger.

The attached drawing is a diagrammatic view of an absorption refrigeration system suitable for practicing the method of the present invention.

The absorption refrigeration system disclosed preferably employs water as the refrigerant and a solution of lithium bromide as the absorbent solution although other refrigerants and absorbents may be employed. As used herein, the term "strong solution" refers to a concentrated solution of lithium bromide which is strong in absorbing power; the term "weak solution" refers to a dilute solution of lithium bromide which is weak in absorbing power.

Referring to the attached drawing, there is shown an absorption refrigeration system suitable for practicing the method of operation of the present invention. The system includes a generator section 2, a condenser section 3, an evaporator section 4 and an absorber section 5 interconnected to provide refrigeration. The evaporator and the absorber sections may be placed within a horizontally extending, substantially cylindrical shell 6.

Generator section 2 comprises a shell 7 having a plurality of fire tubes 8 passing therethrough. Gas jets 9 supply an ignited mixture of gas and air into fire tubes 8 to heat weak solution which is supplied to the generator. A vapor lift tube 10 extends from the top of shell 7. Weak solution is heated in generator section 2 to boil off refrigerant vapor thereby concentrating the weak solution. A mixture of concentrated absorbent solution and refrigerant bubbles rises upwardly through vapor lift tube 10 and passes into separator chamber 11. Equalizer line 12, connecting the bottom of generator 2 and separator 11, serves as an overflow under some conditions and assists in stabilizing generator boiling.

Condenser section 3 may be contained in the same shell as separator chamber 11 and comprises a plurality of heat exchange tubes 13 through which any suitable cooling medium such as water is passed. Refrigerant vapor separates from the mixture of absorbent solution passed to separator chamber 11 and passes to condenser section 3 through eliminators 14. The refrigerant vapor is condensed to liquid refrigerant in condenser section 3 by the cooling medium passing through tubes 13. Liquid refrigerant passes from condenser section 3 through condensate line 15 to spray nozzles 16 in evaporator section 4.

Evaporator section 4 comprises a plurality of longitudinally extending heat exchange tubes 18 disposed in a tube bundle located in a region of shell 6. Water or other heat exchange fluid to be cooled is passed through tubes 18 in heat exchange relation with refrigerant supplied over exterior surfaces of the tubes. Heat is absorbed from the water to be cooled by the refrigerant thereby cooling the water in tubes 18 and vaporizing refrigerant on exterior surfaces of the tubes. The vaporized refrigerant passes from the evaporator section 4 into absorber section 5 carrying with it the heat absorbed from the water passed through tubes 18. The chilled water may be circulated to a place of use as desired. Baffles 20 are provided to direct refrigerant vapor from the spray nozzles 16 toward the tube bundle in the evaporator section.

Shell 6 includes an evaporator sump 21 to receive unevaporated liquid refrigerant which drips off the lower rows of tubes 18. A refrigerant recirculation line 22 receives refrigerant from sump 21, the refrigerant being pumped by pump 23 through line 24 to nozzles 16' where it is again discharged over the top of the tube bundle in the evaporator section.

Strong solution is passed from the lower portion of separator chamber 11 through strong solution line 25, through heat exchanger 26 in which it is placed in heat exchange relation with weak solution passing to the generator, the strong solution flowing from heat exchanger 26 through line 26' to spray nozzles 27 in the absorber, and being distributed by spray nozzles 27 over longitudinally extending tubes 28 to wet the absorber tubes.

Cooling water or other suitable cooling medium is passed through tubes 28 to cool the absorbent solution sprayed on their exterior surfaces. An absorber pan 30 is arranged around the sides and bottom of the tube bundle in the absorber section. Eliminators 31 may be provided if desired in the vapor path between the absorber and the evaporator section.

An absorber discharge conduit 32 collects and discharges the solution into outlet 35 of solution storage sump 36 which is formed in the lower portion of the absorber section of shell 6.

Baffle 37 extends longitudinally of cylindrical shell 6 and separates sumps 21, 36.

A purge line 40 may be provided adjacent the lower portion of the tube bundle in absorber section 5 and is connected to a suitable purge unit 41. If desired, a baffle 42 may be provided between absorber pan 30 and evaporator section 4 to prevent unwanted refrigerant draining into the absorber section.

Absorbent solution is withdrawn from the absorber section through weak solution line 43 connected to outlet 35 of the absorber and is forwarded by pump 44 through line 45, heat exchanger 26 and line 46 to equalizer line 12 where it is forwarded to the generator section for reconcentration. If desired, a portion of the weak solution discharged by pump 44 may be passed through weak solution recirculating line 47 to mix with concentrated absorbent solution in line 26' and recirculate through spray nozzles 27.

A line 48 is provided between equalizer line 12 and the lower portion of absorber 5. A loop 49 is provided in line 48 to maintain pressure difference under normal operating conditions. Line 48 maintains the proper solution level in generator section 2 when the machine is placed in operation, as hereinafter explained.

A line 50 connects line 45 and line 25 on the generator side of heat exchanger 26. Valve 51 is placed in line 50. Preferably, if valve 51 is automatic in operation, it normally closes when supplied with power since it is desirable that it open in case of power failure. Opening of valve 51 permits weak solution to pass from line 45 to line 25 and heat exchanger 26 for a purpose hereinafter described.

Considering operation of the system at start-up, fire tubes 8 in generator 2 are covered with weak solution. Gas jets 9 supply an ignited mixture of gas and air into fire tubes 8 to heat the weak solution. Pump 44 pumps weak solution from the absorber through heat exchanger 26 to equalizer line 12. This general arrangement may render operation at start-up highly unstable for lift tubes are inherently unstable and the generator is forced to find a pumping rate. Under some circumstances, the vapor lift tube might fill with solution so that solution in the generator becomes highly superheated and its conversion to vapor may carry solution through the separator to the condenser to contaminate the refrigerant circuit.

In accordance with the present invention, line 48 is provided, connected to equalizer line 12 at a desired point between the separator 11 and the juncture of line 46 with line 12. At start-up, pump 44 passes weak solution from the absorber through line 45, heat exchanger 26 and line 46 to equalizer line 12. Solution in line 12 backs up therein so that at start-up the head on the generator is never greater than solution level in line 12. Solution in the generator covering the fire tubes is subject, of course, to pressure of solution pumped by pump 44. Solution in line 12 backs up and flows through line 48 to the absorber sump 36. Thus, weak solution is recirculated about the absorber at start-up until substantial boiling of solution in the generator begins. Upon substantial boiling of solution in the generator, the vapor lift tube begins to function, permitting solution to flow from line 12 into the generator and reducing the level of solution in line 12 to an operating height dependent on the head required by the vapor lift tube and the pumping rate; pump 44 thus forwards weak solution to the generator, discontinuing the passage of solution through line 48 to the absorber and providing normal operation of the refrigeration system.

With on-off operation particularly, as previously explained, the heat input penalty is extremely serious because of the dilution requirement. In accordance with the present invention, when refrigeration effect is no longer required, gas input to the generator is discontinued. Pump 44 forwards weak solution from the absorber through line 45 to heat exchanger 26 and line 46 to equalizer line 12. Preferably, valve 51 is opened so that pump 44 also forwards weak solution through line 50 to line 25. Since heat input to the generator is discontinued or substantially discontinued, vapor bubbles in the generator collapse leaving empty space in the generator so that weak solution flows from line 12 to the generator thus diluting solution therein. Almost immediately, solution levels in the generator and line 12 equalize, the weak solution passing through line 12 and line 48 to the absorber. Passage of the hot solution through heat exchanger 46 prevents or retards precipitation of salt on the strong solution side of the heat exchanger.

It is desirable to flush strong solution from the generator rather than merely heat the strong solution in the heat exchanger. When valve 51 in line 50 is open, some amount of weak solution forwarded by pump 44 is bypassed to line 25, mixing with solution in the line 25, mixing with solution in the line and flushing strong solution from the heat exchanger.

In some cases, it may be desirable to maintain a small heat input to the generator. Solution in the generator may be heated to some slight extent so less time is required to raise the temperature of solution in the generator to its boiling point thus expediting start-up of the system when refrigerating effect is again required.

When a need for refrigerating effect again exists, valve 51 is closed, if it has been opened, and the system resumes its normal operation above described.

The present invention provides a method of operation of an absorption refrigeration system which substantially reduces heat input required after temporary shut-downs due essentially to on-off operation. In addition, precipitation of salt from solution in the heat exchanger during such operation is retarded or prevented without any substantial cost increase due to additional heat input at start-up to remove substantial dilution water. A further advantage of the present invention resides in the fact that the arrangement provided damps out undesirable temperature fluctuations usually associated with on-off controls. The present invention provides a self-balancing arrangement to prevent concentration of solution in the generator. That is, the higher the load, the greater the space occupied by vapor bubbles and the more dilution is required upon shut-down. Thus, in temporary shut-down more weak solution is supplied to the generator, diluting strong solution therein.

While we have described a preferred embodiment of the invention, it will be appreciated the invention is not limited thereto since it may be otherwise embodied within the scope of the following claims.

We claim:
1. In a method of operation of an absorption refrigeration system including a generator, a condenser, an absorber, an evaporator, means to forward weak solution from the absorber to the generator, means to supply strong solution from the generator to the absorber and a heat exchanger for placing strong solution and weak solution in heat exchange relation, the steps which consist in, during normal operation, forwarding strong solution from the generator through the heat exchanger to the absorber, forwarding weak solution from the absorber through the heat exchanger in heat exchange relation with the strong solution to the generator, passing cooling medium through the absorber in heat exchange relation with solution therein, and, when refrigeration effect is not required, discontinuing passage of strong solution to the absorber, and circulating at least a portion of the weak solution from the absorber through the strong solution passage of the heat exchanger without passage of that portion of weak solution to the generator and then to the absorber to prevent precipitation of strong solution in the heat exchanger.

2. In a method of operation of an absorption refrigeration system including a generator, a condenser, an absorber, an evaporator, means to forward weak solution from the absorber to the generator, means to supply strong solution from the generator to the absorber and a heat exchanger for placing strong solution and weak solution in heat exchange relation, the steps which consist in, during normal operation, forwarding strong solution from the generator through the heat exchanger to the absorber, forwarding weak solution from the absorber through the heat exchanger in heat exchange relation with strong solution to the generator, passing cooling medium through the absorber in heat exchange relation with solution therein, and, when refrigeration effect is not required, discontinuing passage of strong solution to the absorber, supplying a portion of the weak solution to the generator to dilute strong solution remaining in the generator, and circulating a second portion of the weak solution from the absorber through strong solution passage of the heat exchanger without passage of said second portion into the generator and then to the absorber to prevent precipitation of strong solution in the heat exchanger.

3. In a method of operation of an absorption refrigeration system including a generator, a separator chamber for weak solution and refrigerant vapor, a first line connecting the generator with the separator chamber, a condenser to receive refrigerant vapor from the separator chamber, an evaporator, a second condensate line connecting the evaporator with the condenser, an absorber, said absorber receiving evaporated refrigerant from the evaporator for absorption by solution therein, a third equalizer line connecting the separator chamber with the generator, a fourth line connecting the absorber with the equalizer line, a pump in said fourth line to forward weak solution from the absorber through said fourth line and the equalizer line to the absorber, a fifth line connecting the absorber with the equalizer line, a sixth line connecting the separator chamber with the absorber, a heat exchanger in the sixth and fourth lines to place strong and weak solutions in heat exchange relation, and means for supplying a cooling medium to the absorber in heat exchange relation with solution therein, the steps which consist in, during normal operation, boiling strong solution in the generator, vapor and droplets of refrigerant passing through the first line to the separator chamber, vapor passing from the separator chamber to the condenser, passing strong solution from the separator through the sixth line to the absorber, forwarding weak solution from the absorber through the fourth line in heat exchange relation with strong solution in the heat exchanger and through the equalizer line to the generator, passing a cooling medium through the absorber in heat exchange relation with solution therein, and, when refrigeration effect is not required, discontinuing passage of strong solution through the sixth line to the absorber, and circulating weak solution from the absorber through the fourth line, the heat exchanger, the equalizer line and the fifth line to the absorber to prevent precipitation of strong solution in the heat exchanger and the fifth line.

4. A method of operation of an absorption refrigeration system according to claim 3 including the step of supplying, during operation when refrigeration effect is not required, weak solution from the fourth line to the sixth line to flush strong solution from the heat exchanger.

5. In an absorption refrigeration system including a generator, a separator chamber for weak solution and refrigerant vapor, a first line connecting the generator with the separator chamber, a condenser to receive refrigerant vapor from the separator chamber, an evaporator, a second condensate line connecting the evaporator with the condenser, an absorber, said absorber receiving evaporated refrigerant from the evaporator for absorption by solution therein, a third equalizer line connecting the separator chamber with the generator, a fourth line connecting the absorber with the equalizer line, a pump in said fourth line to forward weak solution from the absorber, through said fourth line and the equalizer line to the absorber, a fifth line connecting the absorber with the equalizer line, a sixth line connecting the separator chamber with the absorber, a heat exchanger in the sixth and fourth lines to place strong and weak solutions in heat exchange relation, means for supplying a cooling medium to the absorber in heat exchange relation with solution therein, a bypass line about the heat exchanger connecting the fourth line and the sixth line, and valve means in said bypass line, actuation of said valve means providing weak solution flow from the fourth line to the sixth line to flush strong solution from the heat exchanger thereby preventing precipitation of strong solution in the heat exchanger when refrigeration effect is not required.

References Cited by the Examiner
UNITED STATES PATENTS

| | | | |
|---|---|---|---|
| 3,014,349 | 12/1961 | Leonard | 62—476 X |
| 3,131,552 | 5/1964 | McNeely | 62—476 X |
| 3,225,556 | 12/1965 | Rohrs | 62—489 X |

LLOYD L. KING, *Primary Examiner.*